United States Patent
van Roermund et al.

(10) Patent No.: US 9,298,955 B2
(45) Date of Patent: Mar. 29, 2016

(54) PROXIMITY ASSURANCE FOR SHORT-RANGE COMMUNICATION CHANNELS

(75) Inventors: Timo van Roermund, Eindhoven (NL); Jan Rene Brands, Nijmegen (NL); Lukasz Szostek, Olsztyn (PL); Marc Vauclair, Overijse (BE); Zoran Zivkovic, 's-Hertogenbosch (NL)

(73) Assignee: NXP B.V., Eindhoven (NL)

( * ) Notice: Subject to any disclaimer, the term of this patent is extended or adjusted under 35 U.S.C. 154(b) by 1067 days.

(21) Appl. No.: 13/290,023

(22) Filed: Nov. 4, 2011

(65) Prior Publication Data

US 2013/0116964 A1    May 9, 2013

(51) Int. Cl.
*H04B 7/00* (2006.01)
*G06K 7/00* (2006.01)
*G06K 7/10* (2006.01)
*G06K 19/07* (2006.01)

(52) U.S. Cl.
CPC .......... *G06K 7/0008* (2013.01); *G06K 7/10257* (2013.01); *G06K 19/0723* (2013.01)

(58) Field of Classification Search
CPC ................... G06K 19/0723; G06K 7/10257
USPC ............ 455/410, 411, 41.1, 41.2, 41.3, 67.11
See application file for complete search history.

(56) References Cited

U.S. PATENT DOCUMENTS

| | | | |
|---|---|---|---|
| 8,761,809 B2 * | 6/2014 | Faith et al. .................. | 455/456.6 |
| 2006/0063511 A1 * | 3/2006 | Shima et al. .................. | 455/410 |
| 2008/0211622 A1 | 9/2008 | Rindtorff et al. | |
| 2009/0167486 A1 * | 7/2009 | Shah et al. ..................... | 340/5.2 |

FOREIGN PATENT DOCUMENTS

| | | |
|---|---|---|
| DE | 10 2009 030456 A1 | 12/2010 |
| WO | 2007043015 A2 | 4/2007 |
| WO | 2009/144534 A1 | 12/2009 |

OTHER PUBLICATIONS

"Mifare.net Contactless Smartcard Technology", Mifare, 1 pg, Aug. 6, 2013 retrieved from the internet at: http://mifare.net/products/smartcardics/mifare_plus.asp (2010).
Extended European Search Report for Patent Appln. No. 12190983.2 (May 7, 2012).
"Bump Technologies", bump technologies , inc., 5 pgs, retrieved from the Internet at: Nov. 4, 2011 http://bu.mp/faq.
Hancke, G. "A Practical Relay Attack on ISO 14443 Proximity Cards", Uni. of Cambridge, 13 pgs., retrieved from the Internet at: Nov. 4, 2011 http://www.rfidblog.org.uk/research.html, (Jan. 2005).
Kfir, Z. et al. "Picking Virtual Pockets using Relay Attacks on Contactless Smartcard", Security and Privacy for Emerging Areas in Communications Networks, pp. 47-58 (2005).
M. Wieb "Performing Relay Attacks on ISO 14443 Contactless Smart Cards using NFC Mobile Equipment", 89 pgs., retrieved from the Internet at: Nov. 4, 2011 http://www.sec.in.tum.de/assets/studentwork/finished/Weiss2010.pdf (May 17, 2010).
Heydt-Benjamin, T. S. et al. "Vulnerabilities in First-Generation RFID-enabled Credit Cards", 15 pgs., retrieved from the internet at: Nov. 7, 2011 citeseerx.ist.psu.edu/viewdoc/download?doi=10.1.1.74...rep . . . —(2007).
Avoine, G. et al. "A Formal Framework for Cryptanalyzing RFID Distance Bounding Protocols", 1 pg. Cryptology ePrint Archive: Report 2009/543, retrieved from the internet at: Nov. 10, 2011 http://eprint.iacr.org/2009/543, (Feb. 16, 2010).

\* cited by examiner

*Primary Examiner* — Ping Hsieh

(57) ABSTRACT

A proximity check ensures that a card is physically close to the reader device in order to inhibit relay attacks. The proximity check makes relay attacks more difficult because an additional channel must be intercepted and/or spoofed or relayed. This solution can be used for any kind of short-range communication, including Near Field Communications (NFC).

20 Claims, 10 Drawing Sheets

PROXIMITY ASSURANCE FOR SHORT-RANGE COMMUNICATION CHANNELS

BACKGROUND

The security of short-range communication systems such as NFC (Near Field Communication) and RFID (Radio Frequency Identification) systems are vulnerable to attacks such as relay attacks. In relay attacks, messages are relayed from the sender to a valid receiver of the message, often via an alternate communication channel. An illustration of a relay attack is shown in FIG. 1. A family 101 is on holiday and has just left their hotel room. The wife 102 has electronically locked hotel door 105 using a short range communication system keycard and put the keycard (not shown) into her pocket. Two attackers are involved in the relay attack: attacker 110 is holding a counterfeit keycard hidden in briefcase 120 and is standing near hotel door 105; attacker 115 has a keycard reader hidden in briefcase 130 and is standing near family 101. The counterfeit keycard in briefcase 120 and the keycard reader in briefcase 130 are connected via a fast, long distance communication channel which functions as a range extender for keycard reader 112 of hotel room door 105. If attacker 115 is close enough to family 101, hotel room door 105 can be opened because a connection can be established between keycard reader 112 of hotel room door 105 and the keycard in the pocket of wife 102.

Such a relay attack can be prevented if keycard reader 112 could get assurance that keycard 103 in the pocket of wife 102 is in the proximity of keycard reader 112. However, an existing stand-alone proximity check implemented in MIFARE PLUS operating in Security Level 3 violates ISO 14443 compliance because it uses a modified (incomplete) frame structure. Proximity checks that are ISO compliant are typically desired. Additionally, MIFARE PLUS uses a timing solution to determine proximity and is a one-way proximity check only. Only the reader checks for the proximity of the RFID card which means the RFID card has no independent way to verify the proximity of the reader. A two-way proximity check is typically more secure than a one-way proximity check.

SUMMARY OF INVENTION

In accordance with the invention a proximity check for two devices is disclosed that typically provides reliable proximity assurance using only local authentication. In accordance with the invention, the devices may be, for example, a smartcard, a smartphone, a card reader and/or a tablet computer. The proximity assurance is achieved by introducing additional sensors such as light and sound sensors and MEMS accelerometers. In accordance with the invention, short range communications such as RFID and NFC may be secured against attacks such as relay attacks.

DETAILED DESCRIPTION

Figure 1:
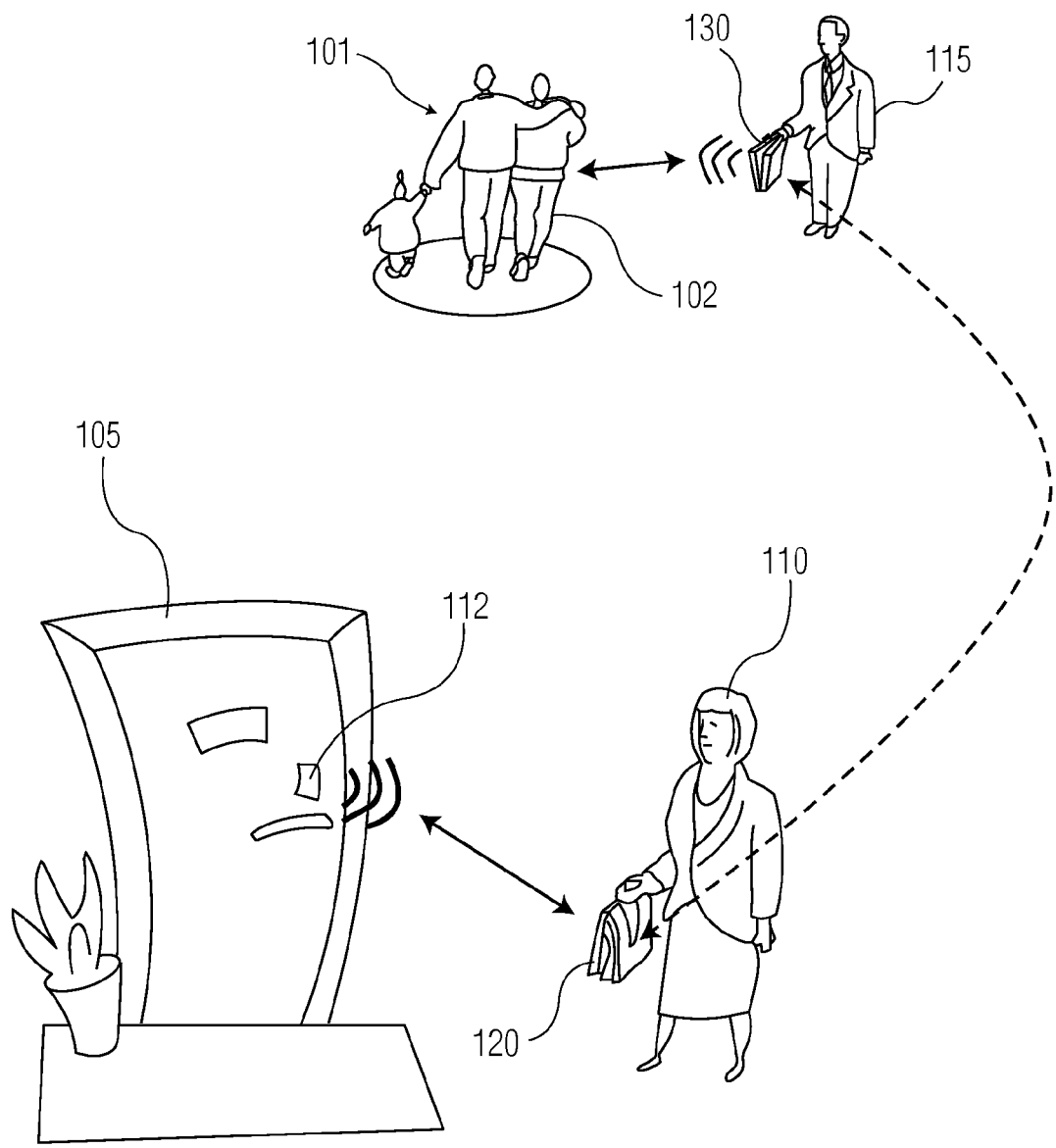
FIG. 1 illustrates a typical relay attack.
Figure 2A:
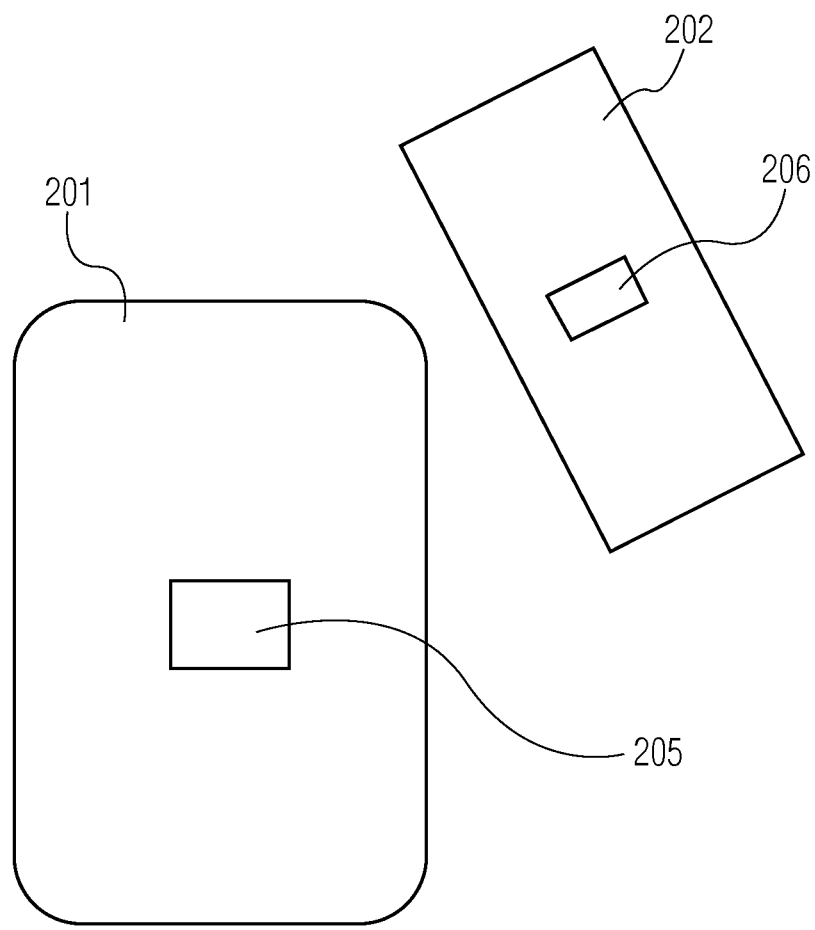
FIG. 2a shows an embodiment in accordance with the invention.

An embodiment in accordance with the invention involves a two-way (symmetric) proximity check between two devices as shown in FIG. 2a. In an embodiment in accordance with the invention, both devices 201 and 202 involved in the communication each establish that the other device is in the proximity (within the typical range of the communication system being used between the two devices) of the other device. Both devices 201, 202 involved in the communication are equipped with accelerometers 205, 206, respectively. To initiate communication between the two devices 201 and 202, requires the user to bump devices 201 and 202 together. Each device 201 and 202 is able to record a bump using its respective accelerometer 205 and 206, respectively, by storing a short history of accelerometer data.

In accordance with the invention, care needs to be taken that accelerometers 205 and 206 are sufficiently sensitive enough. For example, if device 201 has an effective mass that is significantly greater than the effective mass of device 202, accelerometer 205 will need to be more sensitive than accelerometer 206.

Figure 2B:
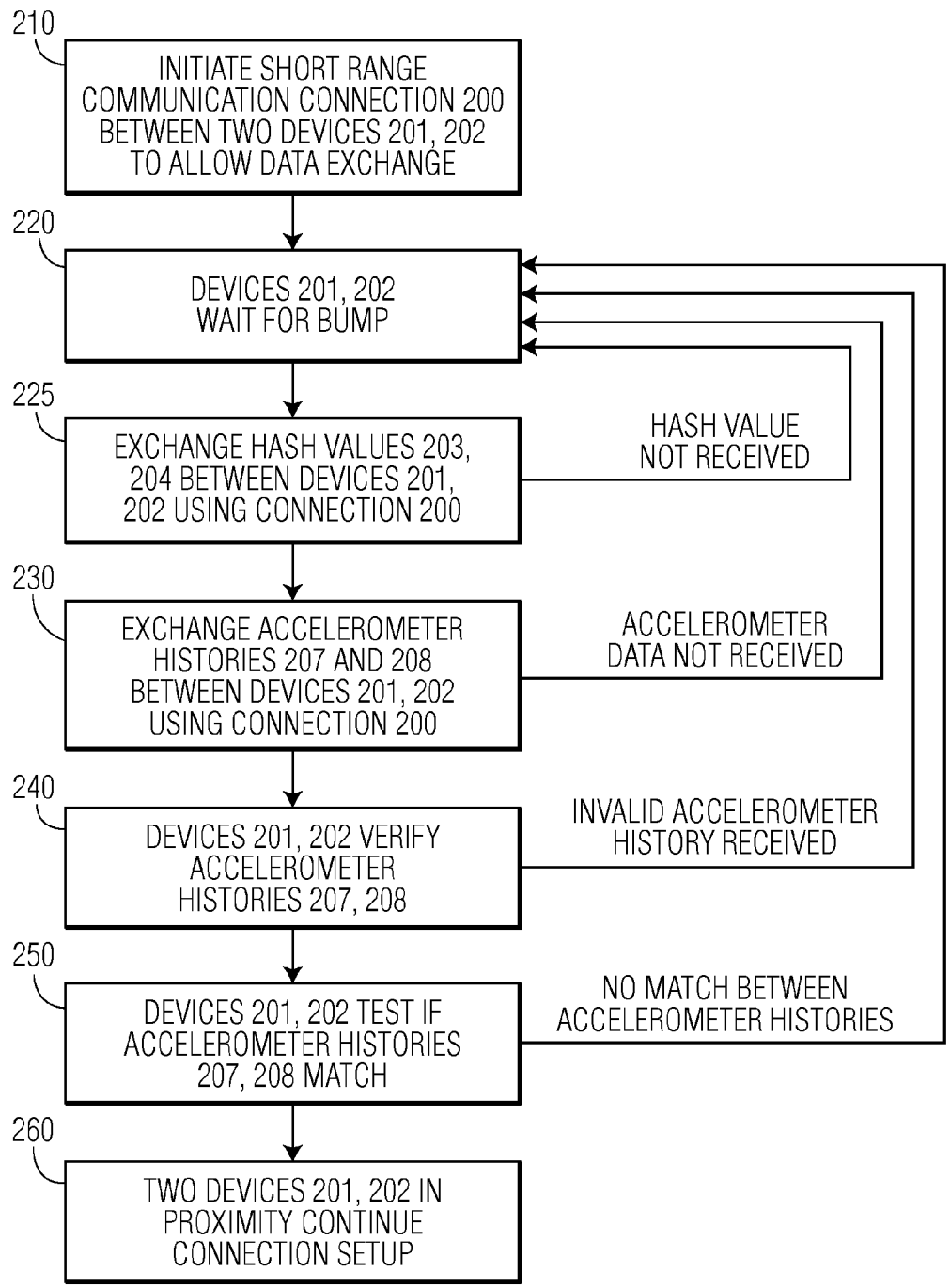
FIG. 2b shows an embodiment in accordance with the invention.

Each device 201 and 202 executes the steps shown in FIG. 2b to obtain proximity assurance to achieve symmetric two-way proximity assurance.

In step 210, short range communication connection 200 is set up between devices 201 and 202 to allow a data exchange. Short range connection 200 may be an RFID or NFC connection. Devices 201 and 202 each keep a short accelerometer data history 207 and 208, of their accelerometers 205 and 206, respectively. Using this accelerometer data history, each device 201 and 202 can detect a bump (i.e. shock). Devices 201 and 202 each poll their respective accelerometers 205 and 206 and update their data history until a bump is detected.

In step 220, when either device 201 or 202 detects a "bump", the accelerometer history is frozen in the respective device. Hash values 203 and 204 are then calculated over the accelerometer data histories 207 and 208 for devices 201 and 202, respectively, using a predetermined cryptographic hash function such as Message-Digest algorithm 5 (MD5) or one selected from the Secure Hash algorithm-2 (SHA-2) set, for example.

Then in step 225, device 201 sends hash value 203 to device 202 and device 202 sends hash value 204 to device 201 using short range communication connection 200. When device 202 has received hash value 203 and device 201 has received hash value 204 from device 202, device 201 proceeds with step 230.

In step 230, device 201 sends its accelerometer data history 207 to device 202 and receives accelerometer data history 208 from device 202 using short range communication connection 200.

In step 240, device 201 verifies accelerometer data history 208 using hash value 204 received from device 202 using short range communication connection 200 prior to the transmission of accelerator data history 207 by device 201 using short range communication connection 200. This allows device 201 to detect when device 202 is counterfeiting accelerometer data 208. For example, device 202 could receive accelerometer data history 207, add some noise to it and send it back to device 201 as accelerometer data 208. In this case, hash value 204 will not match accelerometer history 208 and device 201 will abort the proximity check and wait for the next bump by returning to step 220. Similarly, device 202 verifies accelerometer data history 207 using hash value 203 received from device 201 using short range communication connection 200 prior to the transmission of accelerator data history 208 by device 202 using short range communication connection 200. In the event of non-counterfeit accelerator data histories 207 and 208, devices 201 and 202 proceed to step 250, otherwise devices 201 and 202 return to step 220. Note that in the event of only a one-way verification, devices 201 and 202 return to step 220.

In step 250, device 201 matches accelerometer data history 207 to accelerometer data history 208. If devices 201 and 202 were actually bumped together, accelerometer data history 207 and accelerometer data history 208 will match as indicated by, for example, a sufficiently high correlation between accelerometer data history 207 and accelerometer data history 208. If the correlation is insufficiently high, indicating the lack of a match, device 201 aborts the proximity check and waits for the next bump by returning to step 220. Similarly, device 202 matches accelerometer data history 208 to accelerometer data history 207 and if the correlation is insufficiently high, indicating the lack of a match, device 202 aborts the proximity check and waits for the next bump by returning to step 220. Note that in the event of only a one-way match, devices 201 and 202 return to step 220.

If the two accelerometer data histories 207 and 208 mutually match, device 201 is assured that device 202 is in the proximity of device 201 and device 202 is assured that device 201 is in proximity of device 202. Connection setup then continues in step 260.

Because both devices 201 and 202 execute the steps shown in FIG. 2b, a symmetric two-way (or mutual) proximity assurance is achieved in an embodiment in accordance with the invention. Proximity is assured by the matching of accelerometer data histories 207 and 208.

The exchange of hash values 203 and 204 in step 225 is essential to providing the proximity assurance for each device 201 and 202. As noted above, for example, device 202 could compromise the security by receiving accelerometer data history 207 from device 201, then slightly modify the accelerometer data history 207 by, for example, adding some Gaussian noise, and then sending the modified accelerometer data history back to the device 201 as accelerometer data history 208. This makes it appear that the two accelerometer data histories come from two different accelerometers (because they are slightly different) but the two accelerometer data histories will still show a "bump-match" because only a small amount of noise has been added. The exchange of hash values prior to the exchange of the actual accelerometer data histories prevents this breach of security. Each of the devices 201 and 202 is able to test the integrity of the accelerometer data history afterward. Each device 201 and 202 use the same cryptographic hash function to calculate the hash value for the received accelerometer data history and check whether it matches the received hash value. A non-match indicates a (potential) attempt to breach security.

Figure 3A:
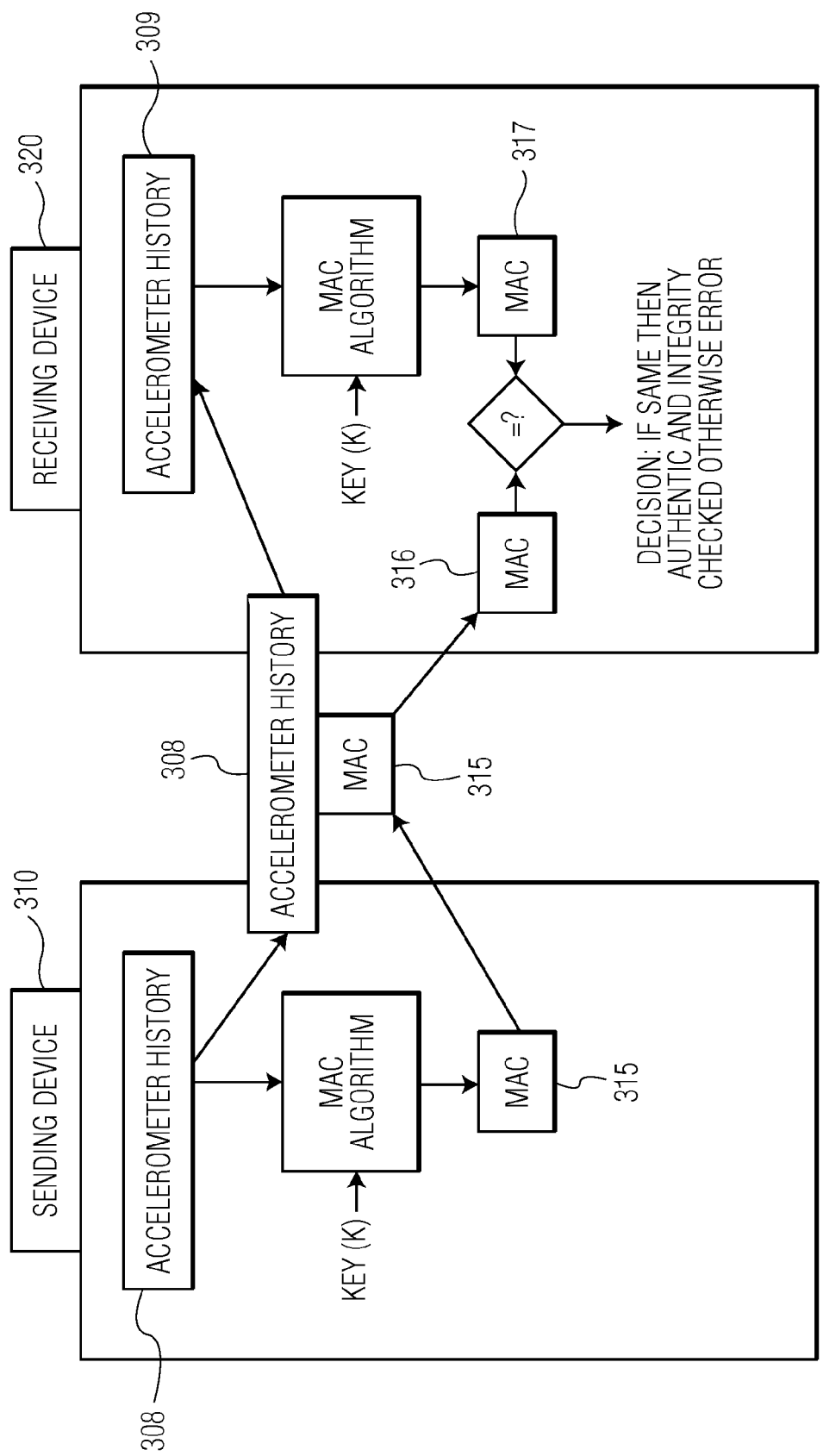
FIG. 3a shows an embodiment in accordance with the invention.

In an embodiment in accordance with the invention, not only proximity assurance but also authentication can be achieved. This may be accomplished by replacing the hash values with a message authentication code (MAC) which can be viewed as a keyed cryptographic hash function. The operation of a MAC is shown in FIG. 3a. The difference between a hash function and a MAC algorithm is that a MAC algorithm does not only take a message as an input but also a secret key. Therefore, devices 310 and 320 in FIG. 3a can check not only the integrity of the accelerometer data histories 308 and 309 but also whether the sending device knows the secret key K.

If sending device 310 has used either the wrong key K to calculate MAC 315 or if the accelerometer data history 308 has been manipulated afterwards, receiving device 320 can determine this because received MAC 316 will not match MAC 317 that receiving device 320 has calculated for received accelerometer data history 309. Receiving device 320 can also determine whether sending device 310 is attempting to execute a replay attack by matching received accelerometer data history 309 with its own accelerometer data history (not shown). This allows the receiving device to determine whether accelerometer data history 308 which sending device 310 has used to calculate MAC 315 is "new". If accelerometer data history 308 is "new" this means MAC 315 is authentic and not a replay of a previous protocol run.

Figure 3B:
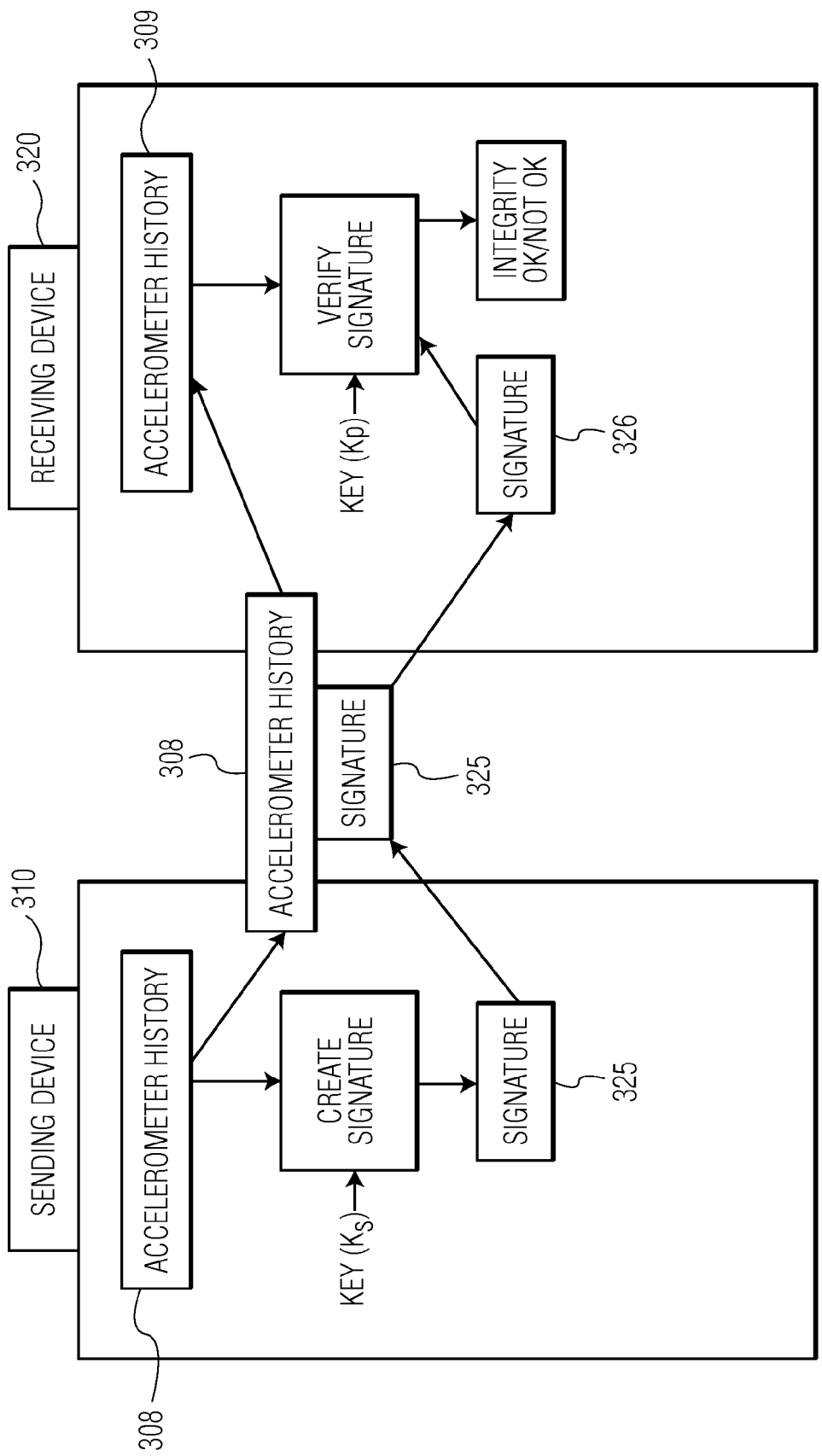
FIG. 3b shows an embodiment in accordance with the invention.

In an embodiment in accordance with the invention, instead of using a symmetric cryptography based MAC for authentication, a public-key cryptography based signature can be used for authentication as shown in FIG. 3b. Instead of calculating a MAC over accelerometer history data 308, a digital signature 325 is created over accelerometer data history 308 using private key, $K_s$. Receiving device 320 can then verify if accelerometer data history 309 has been manipulated afterwards by using public key $K_p$ and signature 326 to verify the authenticity of accelerometer data history 309, where $K_s$, $K_p$ form a key pair.

Figure 4A:
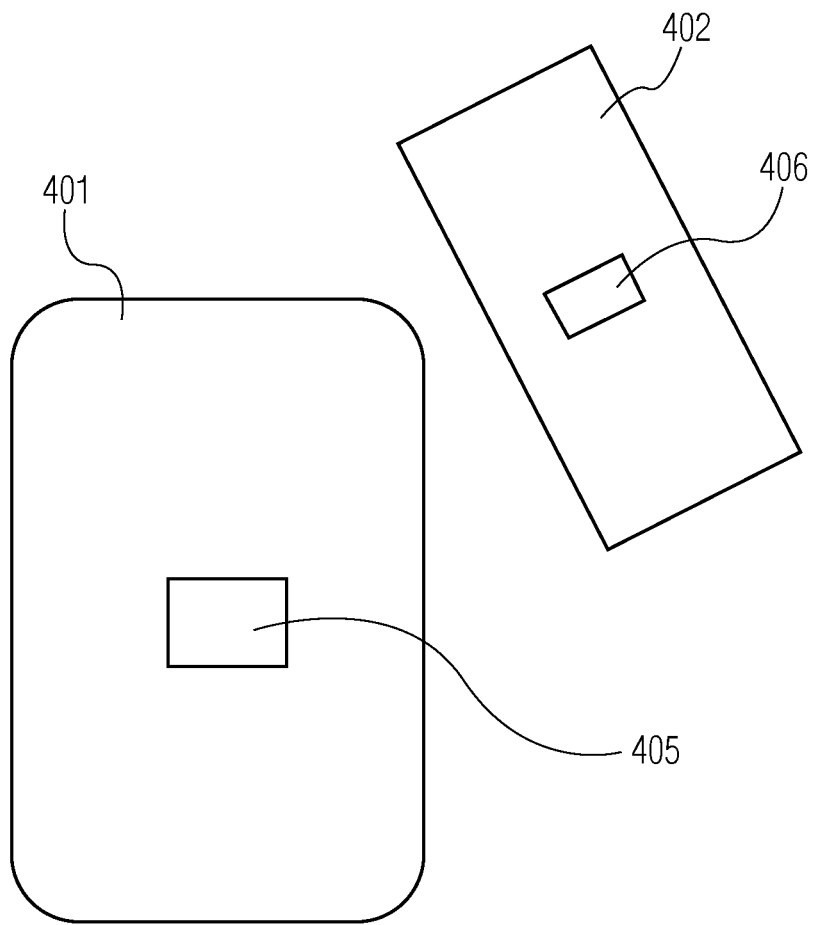
FIG. 4a shows an embodiment in accordance with the invention.

In an embodiment in accordance with the invention, a one-way (asymmetric) proximity check can be achieved using basic bump detectors. Assume, for example, device 401 is a reader and device 402 is a smartcard in an exemplary embodiment in accordance with the invention and each are each equipped with a basic bump detector 405 and 406, respectively, such as a one-dimensional accelerometer or other MEMS sensor that can detect shocks or vibrations (bumps) as shown in FIG. 4a.

Figure 4B:
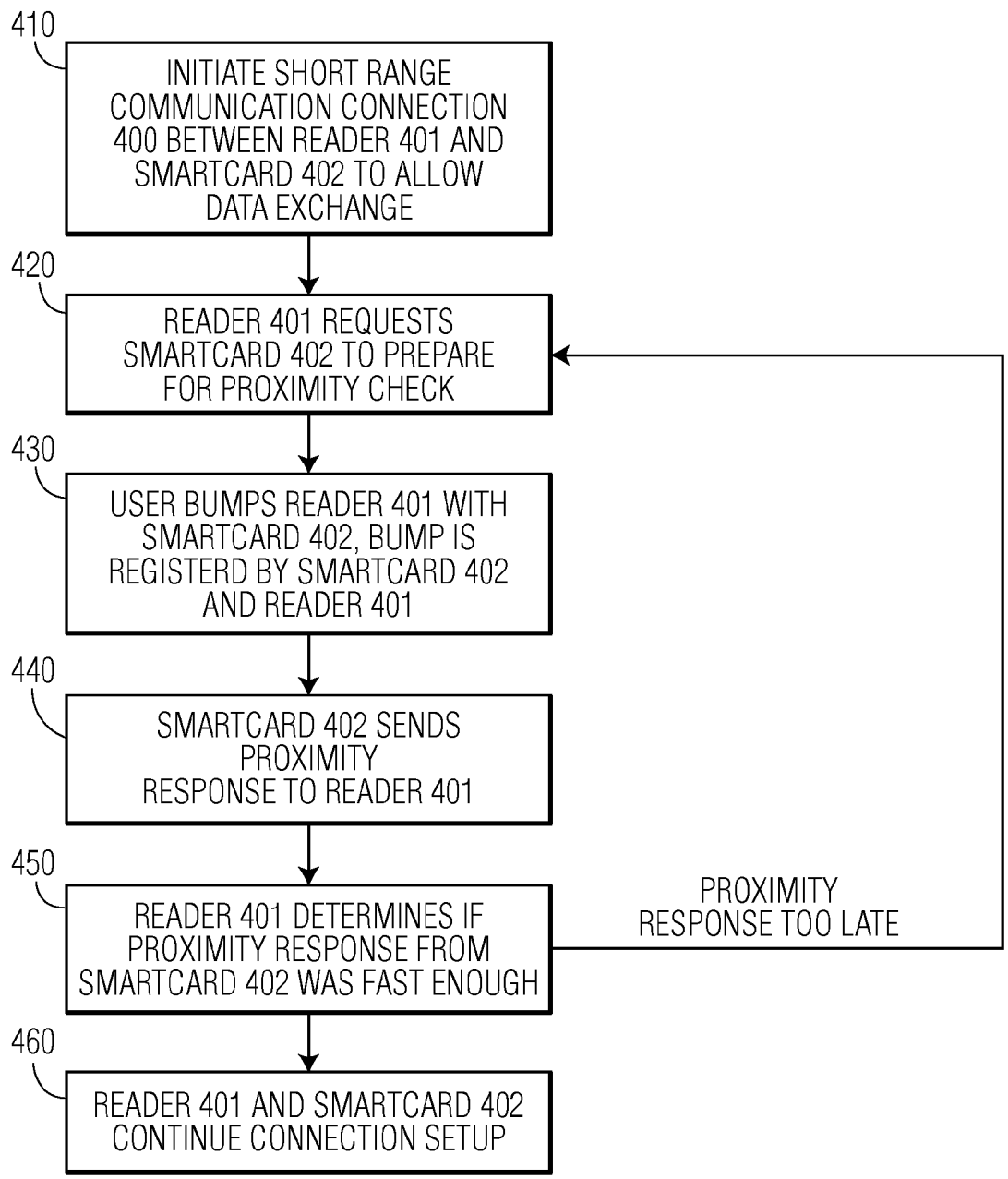
FIG. 4b shows an embodiment in accordance with the invention.

A one-way proximity check can be performed as shown in FIG. 4b for an exemplary embodiment in accordance with the invention. As soon as smartcard 402 moves into the proximity of reader 401, short range communication connection 400 is setup between smartcard 402 and reader 401 in step 410. Then in step 420, reader 401 asks smartcard 402 to prepare for a proximity check. This involves setting smartcard 402 to transmit mode so that smartcard 402 is able to send data as rapidly as possible. In step 430, smartcard 402 bumps reader 401 and this 'bump" is detected by both smartcard 402 and reader 401 using bump detectors 406 and 405, respectively. In step 440, smartcard 402 responds directly to reader 401 using short range communication connection 400 with the shortest possible round trip time. Because reader 401 has also detected the bump, in step 450, reader 401 can determine whether smartcard 402 has responded quickly enough by comparison with some predetermined threshold value. If the response has not occurred rapidly enough, reader 401 returns to step 420. In step 460, if smartcard 402 and reader 401 are in proximity, connection setup is continued.

Note, the time interval between having registered the bump and the start of receiving the response consists of three components in the case of communication according to the ISO 14443 standard:

$T_{mFDT}$: the minimal Frame Delay Time (FDT, e.g. 86.43 μs for the lowest bit rate at a frequency of 13.56 MHz). $T_{mFDT}$ is the time between the end of the last pause transmitted by reader 401 and the first modulation edge within the start bit transmitted by smartcard 402.

$T_{RTT}$: the round-trip time (i.e. between reader 401 and smartcard 402 or between reader 401 and the attacker).

$T_{proc}$: the extra processing time (i.e. in addition to $T_{mFDT}$) needed by smartcard 402. Typically this will be negligible compared to the $T_{mFDT}$.

Hence, the predetermined threshold value typically will have to be set for a time that is larger than the total of these three values, but not appreciably larger. The larger the predetermined threshold value is, the larger the residual time window available to the attacker becomes. Any residual time can be used by an attacker to increase $T_{RTT}$, i.e. to increase the available distance from smartcard 402 from which to mount an attack. The actual predetermined threshold value used will depend on the security level desired and the granularity of time measurement available at reader 401.

Note that reader 401 requests smartcard 402 to enter transmit mode in step 420 before the "bump" occurs in step 430. This allows the response to be sent from smartcard 402 almost immediately after the bump has occurred. The bump sensors in this embodiment do not need to be very accurate as the data of the bump detectors is not matched.

Figure 5A:
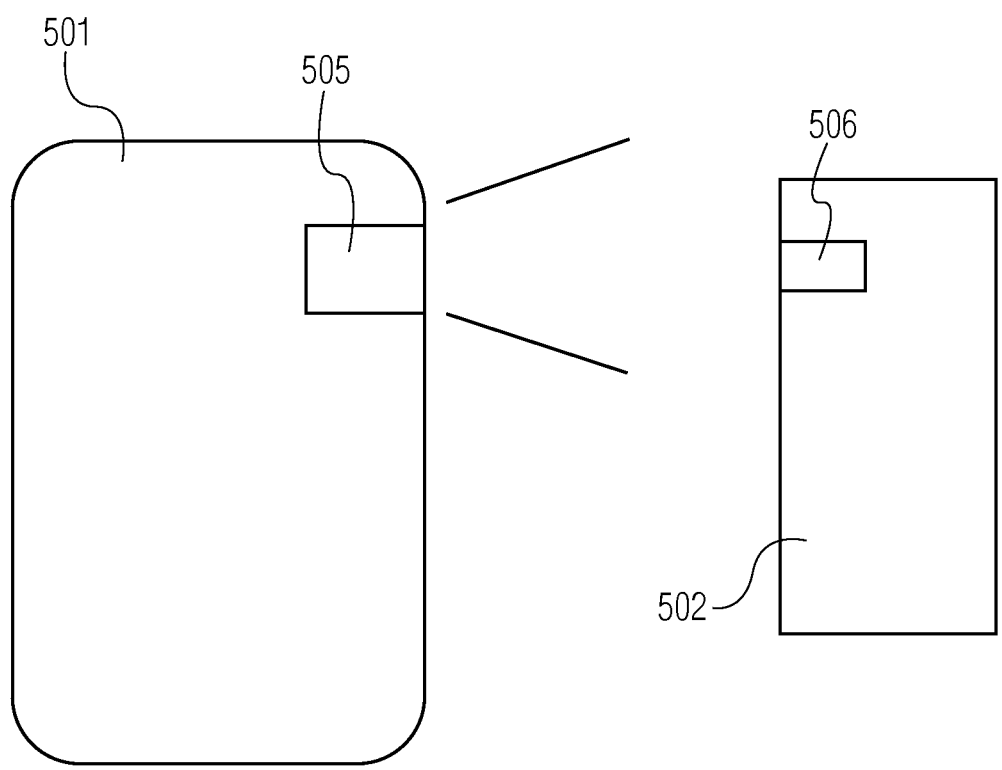
FIG. 5a shows an embodiment in accordance with the invention.

In an exemplary embodiment in accordance with the invention, a one-way (asymmetric) proximity check can be achieved using light source 505 and light sensor 506 which adds a second communication connection between device 501 (e.g. a reader) and device 502 (e.g. a smartcard) as shown in FIG. 5a. The proximity check is accomplished without the use of accelerometers by sensing the light from light source 505 by light sensor 506 in device 502 (e.g. a smartcard). In an embodiment in accordance with the invention, light source 505 may be an infrared light emitting diode (IR-LED) and light sensor 506 may be an infrared sensor.

Figure 5B:
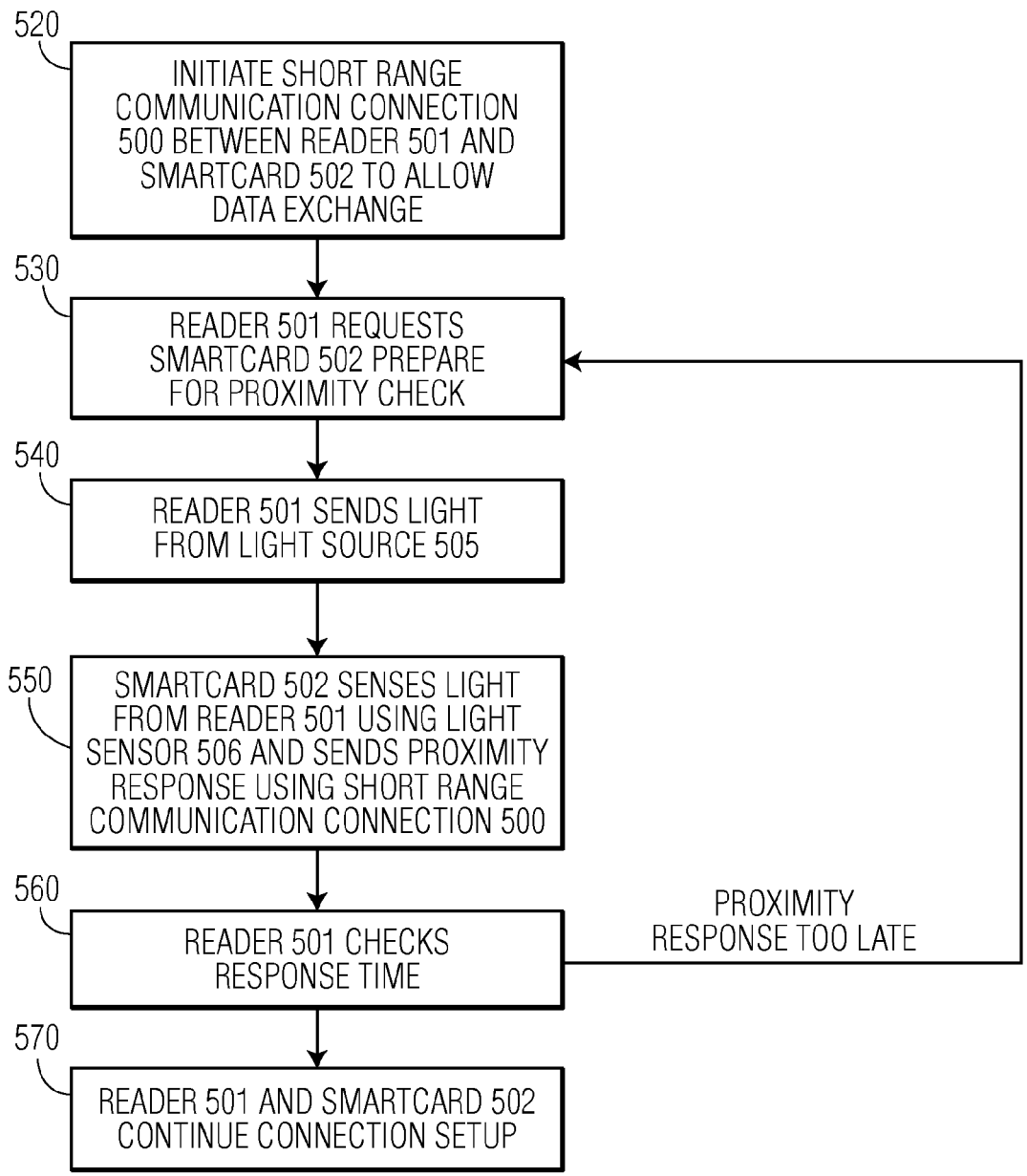
FIG. 5b shows an embodiment in accordance with the invention.

With reference to FIG. 5b, in step 520, short range communication connection 500 is established between device 501 (e.g. a reader) and device 502 (e.g. a smartcard) to allow data exchange. In step 530, device 501 (e.g. a reader) requests that device 502 (e.g. a smartcard) prepare for a proximity check. In step 540, device 501 (e.g. a reader) sends light from light source 505. In step 550, device 502 (e.g. a smartcard) senses light from device 501 (e.g a reader) using light sensor 506 and sends a proximity response signal using the short range communication connection. In step 560, device 501 (e.g. a reader) checks the response time, if the proximity response time is greater than a predetermined threshold value selected to make a relaying attack improbable, device 501 (e.g. a reader) returns to step 530 to request device 502 (e.g. a smartcard) prepare for a proximity check. If the proximity response is timely, in step 570, device 501 (e.g. a reader) and device 502 (e.g. a smartcard) continue the connection set up.

Additionally, in an embodiment in accordance with the invention, in step 540, device 501 (e.g. a reader) may modulate the light from light source 505 to send data to device 502 (e.g. a smartcard). This data may include a session ID such as a random number, for example. Then in step 550, device 502 (e.g. a smartcard) additionally echoes back the received session ID to device 501 (e.g. a reader) using short range communication connection 500. Thus, in step 560, device 501 (e.g. a reader) also determines if the received session ID matches the sent session ID. If it matches, the process proceeds to step 570, if not, device 501 (e.g. a reader) returns to step 530. The use of a session ID provides additional security because in general it makes replay attacks more difficult and in this case it also makes relay attacks more difficult as the light signal would need to be intercepted and relayed as well.

Alternatively, instead of using light source 505 and light sensor 506 in the embodiment in FIGS. 5a and 5b, an embodiment in accordance with the invention may be implemented using a small speaker in place of light source 505 and a sound sensor (e.g. MEMS microphone) in place of light sensor 506.

The embodiments in accordance with the invention described above using light or sound asymmetric proximity checks can be extended to a two-way proximity check by adding a light/sound communication channel from device 502 (eg. a smartcard) to device 501 (e.g. a reader) in analogy to the embodiment described in FIGS. 2a and 2b.

Figure 6:
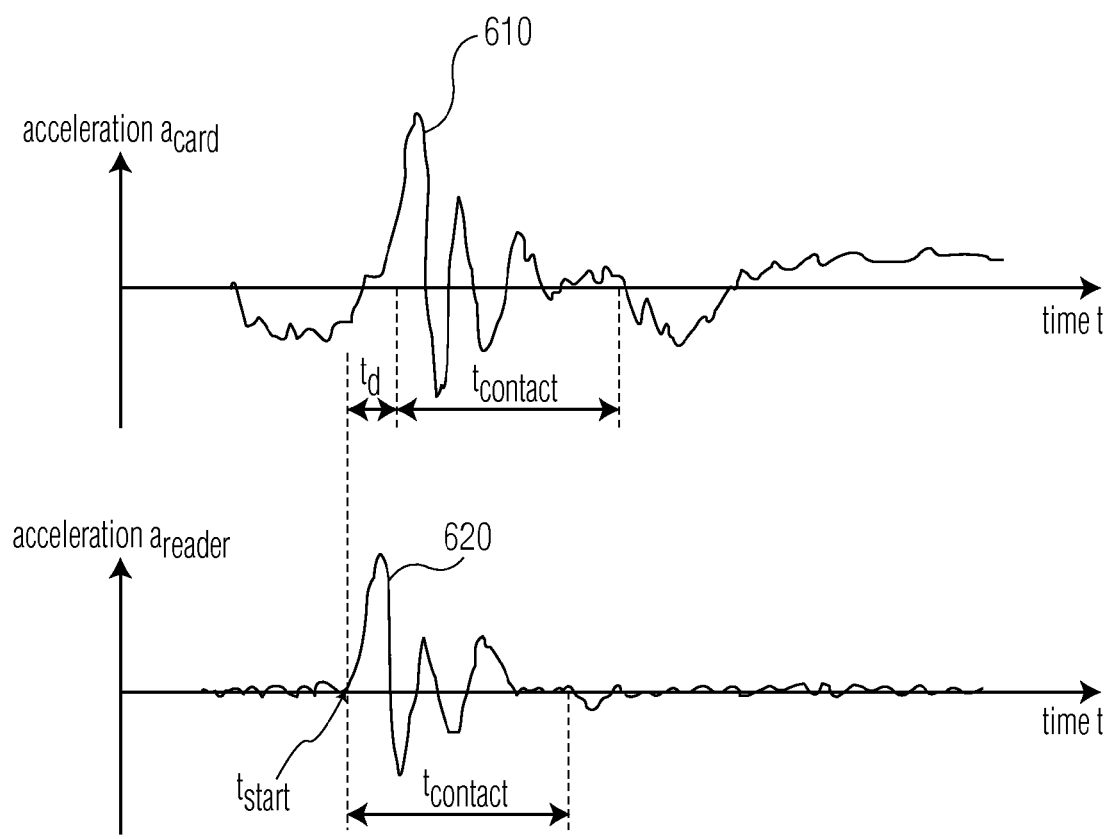
FIG. 6 shows exemplary accelerometer data for a reader and a smartcard type device in an embodiment in accordance with the invention.

In accordance with the invention, a processing implementation for detecting correlated accelerometer measurements is described in the context of FIG. 6 and FIG. 2a. Assume the contact ("bump") between device 201 and device 202 starts at time $t_{start}$ and lasts for time interval $t_{contact}$ as shown in FIG. 6. Because device 201 and device 202 were bumped together, the acceleration measurements during the period of contact should be correlated. As an approximation, it is assumed that there is a linear relationship between time series 610 showing the acceleration data from accelerometer 206 and time series 620 showing the acceleration data from accelerometer 205 during the time interval, $t_{contact}$, defined by scale factor s and bias b. Measurements by accelerometer 206 and accelerometer 205 are not synchronized. The time delay, $t_d$, in accelerometer 206 in device 202 is typically due to communication delay. Therefore in an exemplary embodiment in accordance with the invention, the acceleration, $a_{reader}$ of device 201 (e.g. a reader), can be approximated by the acceleration, $a_{card}$ of device 202 (e.g. a smartcard) using the following relationship:

$$a_{reader}(t) \approx f(a_{card}) = (sa_{card}(t+t_d) + b) \quad (1)$$

Other more complex and precise representations for $f(a_{card})$ are also possible in accordance with the invention. The sum of the squared distances, SSD, between the approximated reader acceleration, $f(a_{card})$, time series 610 and the measured reader acceleration, $a_{reader}$, time series 620 can be used to measure how similar or correlated time series 610 and time series 620 are:

$$SSD = \Sigma_{t=t_{start}}^{t_{start}+t_{contact}} (a_{reader}(t) - (sa_{card}(t+t_d) + b))^2 \quad (2)$$

Other similarity measurement functions may also be used, for example the sum of the absolute differences, signal cross correlation or normalized cross correlation. If Eq. (1) adequately describes the relationship between $a_{reader}$ and $a_{card}$, then SSD will be a relatively small value. If $a_{reader}$ and $a_{card}$ are not related, than a relatively large value will be computed. If SSD is less than a threshold value, the time series 610 and 620 are related, indicating a bump between device 202 (e.g. a smartcard) and device 201 (e.g. a reader).

Initially, in order to determine the parts of time series 610 and 620 where the correlation is to be found, estimated contact starting points are detected. Assuming device 201 (e.g. a reader) is static in an embodiment in accordance with the invention (e.g. a reader that is attached to e.g., a door or wall), it is typically easier to detect estimated contact starting point $\hat{t}_{start}$ in device 201 (e.g. a reader). A value may be established and a bump is detected when the absolute value of $a_{reader}$ of device 201 (e.g. a reader) is greater than the acceleration threshold. This provides an estimated starting point, $\hat{t}_{start}$ for device 201 (e.g. a reader). Similarly, the estimated starting point $\hat{t}_{start}$ for device 202 (e.g. a smartcard) is determined using a different acceleration threshold value. The difference:

$$t_d = \hat{t}_{start} - \hat{t}_{start} \quad (3)$$

provides an estimate of the time delay, $t_d$. If the estimated time delay, $t_d$, is greater than the predetermined threshold time delay value (see above) this can be used to determine that the accelerometer measurements are not related and a bump did not occur between device 201 (e.g. a reader) and device 202 (e.g. a smartcard).

Then it is assumed that the relationship between the measurements of accelerometer 205 and 206 is known (e.g. see Eq. (1)). In case of the linear model presented in Eq. (1), the scale factor s and bias b are known (e.g. by prior calibration). In place of estimating $t_{contact}$, a short time of contact, $\bar{t}_{contact}$, can be defined. This is typically the minimum time of contact required to reliably determine the relationship between $a_{reader}$ and $a_{smartcard}$. The estimate of the sum of the squared differences will then be given by:

$$\widehat{SSD} = \Sigma_{t=i_{start}}^{i_{start}+\bar{t}_{contact}} (a_{reader}(t) - (sa_{card}((t+\hat{t}_d)) + b))^2 \quad (4)$$

If $\widehat{SSD}$ is less than the threshold value, contact between device 201 (e.g. a reader) and device 202 (e.g. a smartcard) will have occurred. Typically, for better detection reliability, the time of contact needs to be as long as possible. One way to extend the time of contact is if device 201 (e.g. a reader) is not totally rigid but is able to move somewhat with device 202 (e.g. a smartcard) during contact. For example, device 201 (e.g. a reader) may be attached to a flexible material (e.g. rubber) or a spring. Furthermore, the accuracy and sampling rate of accelerometers 205 and 206 needs to be sufficiently high.

Because device 202 (e.g. a smartcard) can typically be bumped against device 201 (e.g. a reader) on more than one side, the measured acceleration, $a_{card}$, can have opposite signs. Hence, the assumed linear relationship in Eq. (1) may be inverted and the estimated $\widehat{SSD}$ value may be high. One solution is to calculate the estimated also for the inverted measured acceleration, $-a_{card}$, and use this if it results in a smaller value for $\widehat{SSD}$. Another option is to rectify the accelerometer signals.

If the estimate of the time delay, $\hat{t}_d$, using the two thresholds as described above is not sufficiently accurate and leads to high values for $\widehat{SSD}$ one solution is to calculate $\widehat{SSD}$ for several different time delay values around the estimated time delay, $\hat{t}_d$. Then the minimum value obtained for $\widehat{SSD}$ can be used in accordance with the invention.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for proximity assurance for a short range communication connection between a first device having a first accelerometer and a second device having a second accelerometer comprising:
    establishing the short range communication connection between the first and the second device to allow data exchange;
    creating a bump by bringing the first device and the second device into physical contact and recording the bump in the first and second accelerometer to generate a first and a second accelerometer history of the bump;
    generating a first value using the first accelerometer history and a second value using the second accelerometer history;
    exchanging the values between the first device and the second device using the short range communication channel;
    exchanging the accelerometer histories between the first device and the second device;
    verifying by the second device whether the first value agrees with the first accelerometer history and verifying by the first device whether the second value agrees with the second accelerometer history; and
    determining if the first accelerometer history matches the second accelerometer history in order to verify physical proximity.

2. The method of claim 1 wherein the first and second values comprise hash values.

3. The method of claim 1 wherein the first and second values comprise keyed cryptographic hash values.

4. The method of claim 1 wherein the first and second values comprise digital signatures created using a private key.

5. The method of claim 1 wherein the first device comprises a reader.

6. The method of claim 1 wherein the first device comprises a smartphone.

7. A system comprising a reader and a smartcard wherein physical proximity of the reader and the smartcard is verified using the method of claim 1.

8. A method for proximity assurance for a short range communication connection between a first device having a first bump detector and a second device having a second bump detector comprising:
    establishing the short range communication connection between the first and the second device to allow data exchange;
    creating a bump by bringing the first device and second device into physical contact;
    detecting the bump in both the first and second bump detector;
    having the second device provide a second direct response to the first device using the short range communication channel on detection of the bump by the second bump detector; and
    determining in the first device whether the time interval between detecting the bump and receiving the second direct response at the first device via the short range communication channel was less than a second predetermined threshold value in order to verify physical proximity.

9. The method of claim 8 where the second bump detector comprises a simple accelerometer.

10. The method of claim 8 wherein the first device comprises a reader.

11. The method of claim 8 further comprising: having the first device provide a first direct response to the second device using the short range communication channel on detection of the bump by the first bump detector; and determining in the second device whether a time for the first response by the first device was less than a first predetermined threshold value in order to establish a two-way proximity verification for physical proximity.

12. A system comprising a reader and a smartcard wherein physical proximity of the reader and the smartcard is verified using the method of claim 11.

13. A system comprising a reader and a smartcard wherein physical proximity of the reader and the smartcard is verified using the method of claim 8.

14. A method for proximity assurance for a short range communication connection between a first device having a first source and a second device having a second sensor comprising:
- establishing the short range communication connection between the first and the second device to allow data exchange;
- detecting a first signal from the first source in the first device at the second sensor of the second device;
- having the second device provide a second direct response to the first device using the short range communication channel upon detection of the first signal in the second sensor; and
- determining in the first device whether the time interval between detecting the bump and receiving the second direct response at the first device via the short range communication channel was less than a first predetermined threshold value in order to verify physical proximity.

15. The method of claim 14 wherein the first signal is a light signal.

16. The method of claim 14 wherein the first signal is an acoustic signal.

17. The method of claim 14 wherein the first device comprises a reader.

18. The method of claim 14 wherein the first device further comprises a first sensor and the second device further comprises a second source, further comprising:
- detecting a second signal from the second source in the second device at the first sensor of the first device;
- having the first device provide a first direct response to the second device using the short range communication channel upon detection of the second signal in the first sensor; and
- determining in the second device whether the time interval between detecting the bump and receiving the first direct response at the second device via the short range communication channel was less than a second predetermined threshold value in order to establish a two-way proximity verification for physical proximity.

19. A system comprising a reader and a smartcard wherein physical proximity of the reader and the smartcard is verified using the method of claim 18.

20. A system comprising a reader and a smartcard wherein physical proximity of the reader and the smartcard is verified using the method of claim 14.

* * * * *